United States Patent
Jiménez et al.

(10) Patent No.: US 11,051,149 B2
(45) Date of Patent: Jun. 29, 2021

(54) DEVICE MOBILITY WITH COAP

(71) Applicant: Telefonaktiebolaget LM Ericsson (publ), Stockholm (SE)

(72) Inventors: Jaime Jiménez, Helsinki (FI); Ari Keränen, Helsinki (FI); Jan Melén, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 355 days.

(21) Appl. No.: 15/511,622

(22) PCT Filed: Sep. 25, 2014

(86) PCT No.: PCT/SE2014/051104
§ 371 (c)(1),
(2) Date: Mar. 15, 2017

(87) PCT Pub. No.: WO2016/048208
PCT Pub. Date: Mar. 31, 2016

(65) Prior Publication Data
US 2017/0302745 A1    Oct. 19, 2017

(51) Int. Cl.
*H04W 4/70* (2018.01)
*H04L 29/12* (2006.01)
(Continued)

(52) U.S. Cl.
CPC ............. *H04W 4/70* (2018.02); *H04L 61/103* (2013.01); *H04L 61/2084* (2013.01);
(Continued)

(58) Field of Classification Search
CPC ........ H04W 4/70; H04W 80/04; H04L 67/16; H04L 67/12; H04L 67/04; H04L 61/2084; H04L 61/103; H04L 69/329; H04L 61/15
See application file for complete search history.

(56) References Cited

U.S. PATENT DOCUMENTS 9,467,499 B2 * 10/2016 Bian ................... H04L 41/00
9,614,877 B2 *  4/2017 Shelby ................. H04L 67/02
(Continued)

FOREIGN PATENT DOCUMENTS

WO    WO-2015036776 A1 *  3/2015  ............. H04W 4/70

OTHER PUBLICATIONS

Lightweight Machine to Machine Technical Specification, Open Mobile Alliance, OMA-TS-LightweightM2M-V1_0-20130917-D (Year: 2013).*
(Continued)

*Primary Examiner* — Javier O Guzman
(74) *Attorney, Agent, or Firm* — NDWE LLP (57) ABSTRACT

A method performed in a network connected endpoint device having a first address as its current address. The method comprises receiving Constrained Application Protocol (CoAP) signalling from a network server. The received signalling comprises an Observe request for an information resource of the endpoint device. The resource comprises the current address of the endpoint device stored therein. The method also comprises, in accordance with the received signalling comprising the Observe request, sending CoAP signalling to the network server. The sent signalling comprises information about the current address of the endpoint device stored in the resource. The technique also relates to a method of the network server as well as to the endpoint device and the network server.

20 Claims, 4 Drawing Sheets

(51) Int. Cl.
*H04L 29/08* (2006.01)
*H04W 80/04* (2009.01)
(52) U.S. Cl.
CPC .............. *H04L 67/04* (2013.01); *H04L 67/12* (2013.01); *H04L 67/16* (2013.01); *H04L 61/15* (2013.01); *H04L 69/329* (2013.01); *H04W 80/04* (2013.01)

(56) References Cited

U.S. PATENT DOCUMENTS

| | | | | |
|---|---|---|---|---|
| 10,084,659 B2* | 9/2018 | Dong | ...................... | H04L 67/16 |
| 2011/0274035 A1* | 11/2011 | Yadav | .................. | H04W 40/24 |
| | | | | 370/328 |
| 2013/0110920 A1* | 5/2013 | Broustis | ................ | H04L 67/104 |
| | | | | 709/204 |
| 2013/0151708 A1* | 6/2013 | Shelby | .................. | H04L 67/025 |
| | | | | 709/226 |
| 2013/0179557 A1* | 7/2013 | Bian | ........................ | H04L 41/00 |
| | | | | 709/223 |
| 2013/0212215 A1* | 8/2013 | Ukkola | ................... | H04L 67/02 |
| | | | | 709/217 |
| 2014/0025825 A1* | 1/2014 | Ukkola | ................... | H04W 4/70 |
| | | | | 709/226 |
| 2014/0140254 A1* | 5/2014 | Nieminen | ................ | H04W 4/70 |
| | | | | 370/311 |
| 2014/0344269 A1* | 11/2014 | Dong | ...................... | H04L 67/12 |
| | | | | 707/736 |
| 2014/0359133 A1* | 12/2014 | Tian | ........................ | H04L 47/72 |
| | | | | 709/226 |
| 2015/0264134 A1* | 9/2015 | Dong | ...................... | H04L 67/16 |
| | | | | 709/204 |
| 2015/0295785 A1* | 10/2015 | Fan | ......................... | H04L 67/12 |
| | | | | 709/203 |
| 2016/0100028 A1* | 4/2016 | Erdmann | ............... | G08C 17/00 |
| | | | | 709/219 |
| 2016/0234628 A1* | 8/2016 | Rahman | .............. | H04L 12/2809 |
| 2017/0164286 A1* | 6/2017 | Jeong | ............... | H04W 52/0258 |

OTHER PUBLICATIONS

International Search Report and Written Opinion, Application No. PCT/SE2014/051104, dated Jun. 18, 2015, 11 pages.

"Lightweight Machine to Machine Technical Specification," Sep. 17, 2013, 101 pages, Draft Version 1.0, OMA-TS-LightweightM2M-V1_0-20130917-D, Open Mobile Alliance Ltd.

K. Li et al., "CoAP Option Extension: NodeId draft-li-core-coap-node-id-option-00," Dec. 10, 2013, 7 pages, Internet-Draft, IETF Trust and the persons identified as the document authors.

Z. Shelby et al., "Constrained Application Protocol (CoAP) draft-ietf-core-coap-18," Jun. 28, 2013, 118 pages, Internet-Draft, IETF Trust and the persons identified as the document authors.

C. Perkins et al., "Mobility Support in IPv6," Jul. 2011, 169 pages, Request for Comments: 6275, IETF Trust and the persons identified as the document authors.

K. Hartke et al., "Observing Resources in CoAP draft-ietf-core-observe-12," Feb. 14, 2014, 33 pages, Internet-Draft, IETF Trust and the persons identified as the document authors.

International Preliminary Report on Patentability for Application No. PCT/SE2014/051104, dated Apr. 6, 2017, 7 pages.

Communication pursuant to Article 94(3) EPC for Application No. 14783683.7, dated May 29, 2018, 4 pages.

Communication pursuant to Article 94(3) EPC for Application No. 14783683.7, dated Aug. 9, 2019, 3 pages.

Summons to attend oral proceedings pursuant to Rule 115(1) EPC for Application No. 14783683.7, Mar. 9, 2020, 6 pages.

* cited by examiner

DEVICE MOBILITY WITH COAP

CROSS-REFERENCE TO RELATED APPLICATIONS

This application is a National stage of International Application No. PCT/SE2014/051104, filed Sep. 25, 2014, which is hereby incorporated by reference.

TECHNICAL FIELD

The present disclosure relates to methods and devices for allowing mobility of a device using the Constrained Application Protocol (CoAP) in a communication network.

BACKGROUND

Machine Devices (MDs) or constrained devices, as many other devices connected to the Internet, can move to different places in a communication network and hence be reachable at different Internet Protocol (IP) addresses at different times. This is called IP mobility.

The MDs commonly use the Constrained Application Protocol (CoAP) for communicating with each other and with other hosts in the Internet. CoAP allows devices to access each others' resources (e.g., a temperature reading of a temperature sensor) and also to subscribe to changes of the values using the Observe extension (Observe).

The traditional ways of solving device mobility include Mobile IP (MIP), Host Identity Protocol (HIP), etc. These protocols introduce some sort of rendezvous system and way to inform endpoints of the new IP address when it changes.

SUMMARY

It is an objective of the present disclosure to provide an improved way of handling mobility of CoAP capable devices in a communication network.

According to an aspect of the present disclosure, there is provided a method performed in a network connected endpoint device having a first address as its current address. The method comprises receiving CoAP signalling from a network server. The received signalling comprises an Observe request for an information resource of the device. The resource comprises the current address of the device (e.g. the first address, or another (second) address if the current address of the device has changed) stored therein. The method also comprises, in accordance with the received signalling comprising the Observe request, sending CoAP signalling to the server. The sent signalling comprises information about the current address (e.g. the first address, or another (second) address if the current address of the device has changed) of the device stored in the resource.

According to another aspect of the present disclosure, there is provided a method performed in a network server. The method comprises sending CoAP signalling to a network connected endpoint device having a first address as its current address. The sent signalling comprises an Observe request for an information resource of the device. The resource comprises the current address (e.g. the first address, or another (second) address if the current address of the device has changed) of the device stored therein. The method also comprises, in accordance with the sent signalling comprising the Observe request, receiving CoAP signalling from the device. The received signalling comprises information about the current address (e.g. the first address, or another (second) address if the current address of the device has changed) of the device stored in the resource.

According to another aspect of the present disclosure, there is provided a device configured for being a network connected endpoint device having a first address as its current address. The device comprises processor circuitry, and a storage unit storing instructions executable by said processor circuitry whereby said device is operative to receive CoAP signalling from a network server. The received signalling comprises an Observe request for an information resource of the device. The resource comprises the current address of the device stored therein. The device is also operative to, in accordance with the received signalling comprising the Observe request, send CoAP signalling to the server. The sent signalling comprising information about the current address of the device stored in the resource.

According to another aspect of the present disclosure, there is provided a network server comprising processor circuitry, and a storage unit storing instructions executable by said processor circuitry whereby said server is operative to send CoAP signalling to a network connected endpoint device having a first address as its current address. The sent signalling comprises an Observe request for an information resource of the device. The resource comprises the current address of the device stored therein. The server is also operative to, in accordance with the sent signalling comprising the Observer request, receive CoAP signalling from the device. The received signalling comprises information about the current address of the device stored in the resource.

According to another aspect of the present disclosure, there is provided a computer program product comprising computer-executable components for causing a network connected endpoint device to perform an embodiment of a method of the present disclosure when the computer-executable components are run on processor circuitry comprised in the device.

According to another aspect of the present disclosure, there is provided a computer program product comprising computer-executable components for causing a network server to perform an embodiment of a method of the present disclosure when the computer-executable components are run on processor circuitry comprised in the server.

According to another aspect of the present disclosure, there is provided a computer program comprising computer program code which is able to, when run on processor circuitry of a network connected endpoint device having a first address as its current address, cause the device to receive CoAP signalling from a network server. The received signalling comprises an Observe request for an information resource of the device. The resource comprises the current address of the device stored therein. The code is also able to cause the device to, in accordance with the received signalling comprising the Observe request, send CoAP signalling to the server. The sent signalling comprises information about a current address of the device stored in the resource.

According to another aspect of the present disclosure, there is provided a computer program comprising computer program code which is able to, when run on processor circuitry of a network server, cause the server to send CoAP signalling to a network connected endpoint device having a first address as its current address. The sent signalling comprises an Observe request for an information resource of the device. The resource comprises the current address of the device stored therein. The code is also able to cause the server to, in accordance with the sent signalling comprising the Observe request, receive CoAP signalling from the device. The received signalling comprises information about the current address of the device stored in the resource.

According to another aspect of the present disclosure, there is provided a computer program product comprising an embodiment of a computer program of the present disclosure and a computer readable means on which the computer program is stored.

By storing the current address of the device in a dedicated resource in accordance with CoAP, the server is enabled to obtain the current address of the device by subscribing to the resource in accordance with the CoAP standard. The current address of the device may thus be sent to the server whenever the resource is updated with a new current address. The current address is the address which currently identifies a location in the network of the device. When the device moves within the network, or for some other reason obtains a new address, the resource is updated with the new current address and a notification is sent to the server with the new address. Thereby, the server is able to keep track of, and communicate with, the device. CoAP is used for the mobility of the device, instead of any additional protocols which are otherwise required.

Supporting additional protocols (e.g., MIP or HIP) increase the requirements for the device, especially regarding memory (both Random Access Memory (RAM) and Read Only Memory (ROM)). This is particularly problematic with constrained devices that commonly have only some tens or hundreds of kilobytes of memory available for all functionality. Also these protocols offer generic mobility solution and hence have features that are not needed by constrained devices or that create unnecessary overhead, e.g., due to tunneling.

By means of embodiments of the present disclosure, CoAP may be re-used also for device mobility (could alternatively be called nomadicity). In order to accomplish mobility, the device needs to somehow inform other hosts in the network, e.g. the network server, about its current address, e.g. IP address or other location identifier. For this purpose, a new resource type, the current address of the device, is introduced. When the device makes this resource available, other hosts such as the network server may subscribe to this resource using the CoAP Observe extension and be notified of the new address of the device and continue communication using the current address even when after it has changed. Thus, embodiments of the present disclosure allow device mobility with lower resource consumption in the device than more generic solutions, such as MIP or HIP, since they do not require the implementation of additional protocols. Moreover, they may expose the state of the device address via Representational State Transfer (REST) as an observable resource.

A further advantage with using CoAP in accordance with the present disclosure is that no standard changes are needed. The CoAP protocol has mechanisms for creating new resources/objects in a device. However, some minor standard changes may be convenient for the syntax of the mobility Objects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

Figure 1:
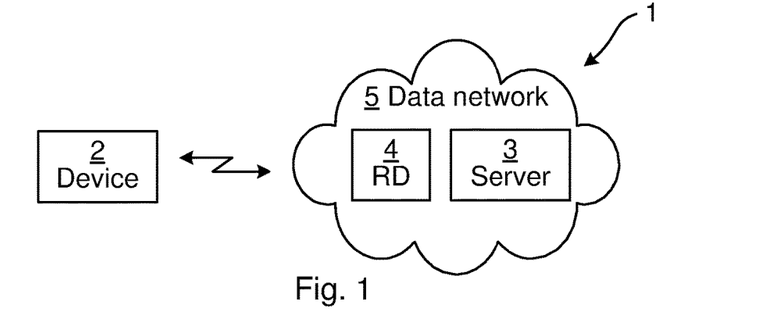
FIG. 1 is a schematic block diagram of a communication network in accordance with the present disclosure.

FIG. 1 is a schematic overview of an embodiment of a communication network 1 in which an endpoint device 2, e.g. a constrained MD, is connected to a data network 5, e.g. a public and/or packet data network (PDN). The data network 5 may comprise at least one CoAP Resource Directory (RD) 4, or some other resource discovery mechanism, with which the device 2 is registered as well as a network server 3 which is configured for managing the device 2, e.g. in communication with the device 2 and subscribing to information, e.g. sensor readings, from the device 2. The device 2 may be connected with the data network 5 wirelessly (i.e. being a radio device 2) or via a wired connection. Embodiments of the present disclosure may be especially advantageous with constrained devices e.g. MDs using CoAP.

Herein, we will exemplify with an endpoint device 2 capable of running CoAP and the lightweight machine-to-machine protocol (LWM2M) built on top of CoAP, and a server 3 (as manager of the device 2) that uses LWM2M to manage the device.

The endpoint device 2 is enabled with the functionality described herein. The device 2 can create a resource that exposes its current address information (e.g. comprising its IP address, both IPv4 and IPv6) as well as the address of the RD 4 it is registered to and the value of its entry in the RD if applicable. This resource is created either during bootstrap or explicitly by the server 3 acting as a manager of the device 2. The resource is updated with every change of address occurring in the device 2 and it is written by the device itself.

Figure 2:
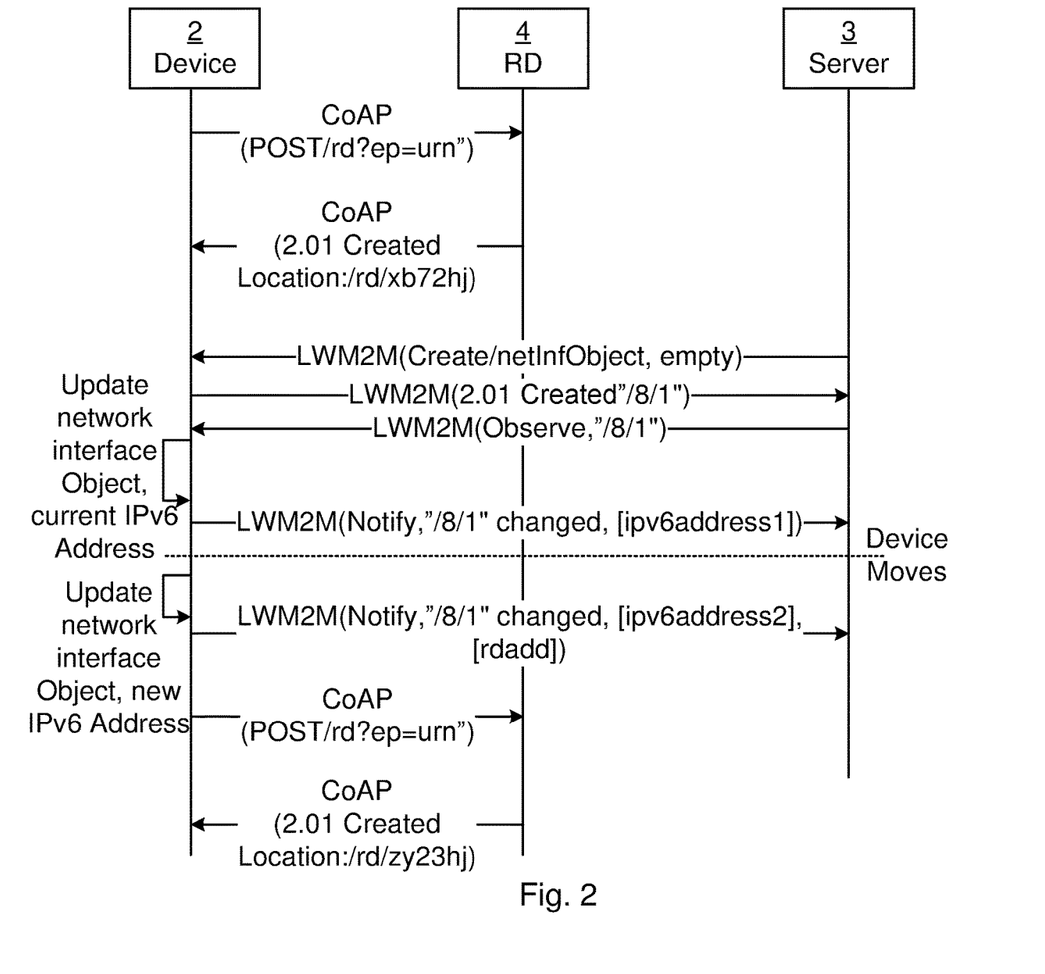
FIG. 2 is a schematic signalling diagram illustrating signalling for setting up a new resource and subscribing to it using the Object extension in accordance with the present disclosure.

FIG. 2 is a schematic signalling diagram illustrating embodiments of the present disclosure. The location addresses and Object ID in the figure are only chosen as examples. As shown in FIG. 2, an endpoint device 2 has already been bootstrapped and has connectivity with the data network 5. The device 2 registers itself in the RD 4 and gets its location in the rd (i.e. /rd/xb72hj, in accordance with the example in FIG. 2). A node, e.g. the server 3, typically finds the device 2 via the RD 4 with which it is registered. Then, the server 3 creates the new Network Information Object/resource in the device 2 (if not previously done e.g. by another node/server in the network 5 or not preconfigured in the device 2) and sends an observation message of that object (LWM2M is used for consistency but it could just as well be a CoAP Observe made by any other type of CoAP client). The address (e.g. IP address) of the server 3 is included in the header of the observation message, allowing the device 2 to store the server address for future use when contacting the server 3 regardless of the location of the device 2. The device 2 then updates the empty Object in the just created resource with its current address (e.g. IP address) and the information about its RD 4 as well as its location in the RD. These last two fields may be important in case the address is only from a local network, it would help the discovery of the device 2 by other nodes in the network 1. Then, the device 2 may send a notification to the Observers of the Object, in this case the server 3, with the information from the updated resource/object.

After a while the device 2 moves to another place in the network (mobility, e.g. IP mobility, as indicated with the dotted horizontal line in FIG. 2) and therefore changes its address. Thus, the device 2 updates its network interface Object of the resource previously created by removing the old address there from and storing the new address in the resource. Then, the device 2 will notify the Observers of the Object, in this case the server 3, about the new address. The device may also re-register on the previous RD 4 or in a new one, after registration it would notify the server 3 if the RD information changes (not shown).

Figure 3A:
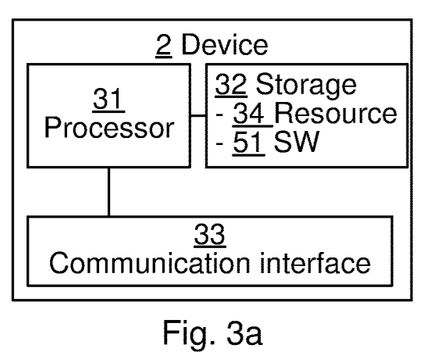
FIG. 3a is a schematic block diagram of an embodiment of a device in accordance with the present disclosure.

FIG. 3a is a schematic block diagram of an embodiment of a device 2 in accordance with the present disclosure. The device 2 comprises processor circuitry 31 e.g. a central processing unit (CPU). The processor circuitry 31 may comprise one or a plurality of processing units in the form of microprocessor(s). However, other suitable devices with computing capabilities could be comprised in the processor circuitry 31, e.g. an application specific integrated circuit (ASIC), a field programmable gate array (FPGA) or a complex programmable logic device (CPLD). The processor circuitry 31 is configured to run one or several computer program(s) or software (SW) 51 (see also FIG. 5) stored in a data storage 32 of one or several storage unit(s) e.g. a memory. The data storage 32 also comprises the created resource 34, comprising the Object discussed herein, which is configured for holding information about the current address of the device 2. The storage unit 32 is regarded as a computer readable means 52 (see FIG. 5) as discussed herein and may e.g. be in the form of a Random Access Memory (RAM), a Flash memory or other solid state memory, or a hard disk, or be a combination thereof. The processor circuitry 31 may also be configured to store data in the storage 32, as needed. The device 2 also comprises a communication interface 33, e.g. a radio interface, comprising a transmitter, a receiver and (if a radio interface) an antenna, which may be combined to form a transceiver or be present as distinct units within the communication interface 33.

According to an aspect of the present disclosure, there is provided a device 2 configured for being a network connected endpoint device having a first address as its current address. The device comprises processor circuitry 31, and a storage unit 32 storing instructions executable by said processor circuitry 31 whereby said device 2 is operative to receive Constrained Application Protocol (CoAP) signalling from a network server 3. The signalling comprises an Observe request for an information resource 34 of the device 2. The resource comprises the current address of the device stored therein. The device 2 is also operative to, in accordance with the received signalling comprising the Observe request, send CoAP signalling to the server 3, the signalling comprising information about the current address of the device 2 stored in the resource 34.

Figure 3B:
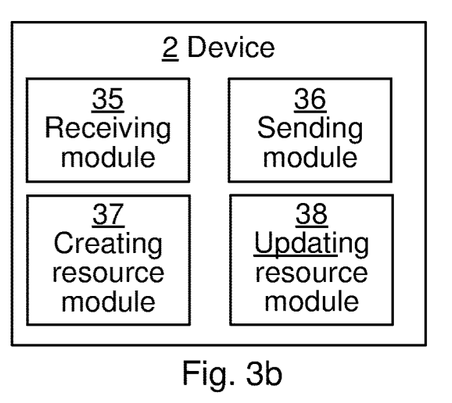
FIG. 3b is a schematic functional block diagram of an embodiment of a device in accordance with the present disclosure.

FIG. 3b is a schematic block diagram illustrating an embodiment of functional modules in the device 2, e.g. in the processor circuitry 31 of FIG. 3a. As previously mentioned, the processor circuitry 31 may run software 51 for enabling the device 2 to perform an embodiment of a method of the present disclosure, whereby functional modules may be formed for performing the different steps of the method. These modules are schematically illustrated as blocks within the device 2 in FIG. 3b. Thus, the device 2 comprises a receiving module 35 for receiving CoAP signalling from the network server 3, the signalling comprising an Observe request for an information resource of the device 2, said resource comprising the current address of the device stored therein. The device 2 also comprises a sending module 36 for sending CoAP signalling to the server 3 in accordance with the received Observe request, the signalling comprising information about the current address of the device 2 stored in the resource. Also, the receiving module may in some embodiments be configured for receiving CoAP signalling comprising instructions to create the resource 34 in the device 2, the resource being configured for comprising the current address of the device. The device 2 may further comprise a creating resource module 37 for creating the resource 34 in accordance with the received instructions from the server 3. Then, the device 2 may also comprise an updating resource module 38 for updating the created resource 34 by storing the current address of the device 2 in the newly created, previously empty, resource 34. Also or alternatively, the receiving module may in some embodiments be configured for receiving a new (second) address of the device 2, e.g. in case of mobility of the device, thus obtaining said new address, after which the updating resource module 38 may update the resource 34 by removing the old (first) address and instead storing the obtained new (second) address in the resource 34.

Figure 4A:
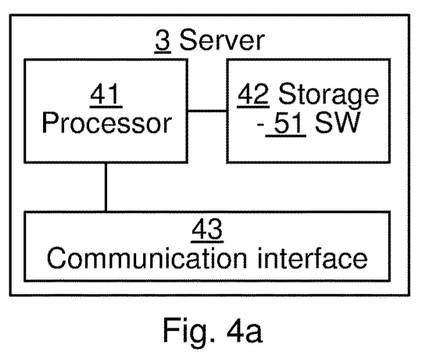
FIG. 4a is a schematic block diagram of an embodiment of a server in accordance with the present disclosure.

FIG. 4a is a schematic block diagram of an embodiment of a network server 3 in accordance with the present disclosure. The server 3 comprises processor circuitry 41 e.g. a central processing unit (CPU). The processor circuitry 41 may comprise one or a plurality of processing units in the form of microprocessor(s). However, other suitable devices with computing capabilities could be comprised in the processor circuitry 41, e.g. an application specific integrated circuit (ASIC), a field programmable gate array (FPGA) or a complex programmable logic device (CPLD). The processor circuitry 41 is configured to run one or several computer program(s) or software (SW) 51 (see also FIG. 5) stored in a data storage 42 of one or several storage unit(s) e.g. a memory. The storage unit 42 is regarded as a computer readable means 52 (see FIG. 5) as discussed herein and may e.g. be in the form of a Random Access Memory (RAM), a Flash memory or other solid state memory, or a hard disk, or be a combination thereof. The processor circuitry 41 may also be configured to store data in the storage 42, as needed. The server 3 also comprises a communication interface 43, comprising a transmitter and a receiver, which may be combined to form a transceiver or be present as distinct units within the communication interface 43.

According to an aspect of the present disclosure, there is provided a network server 3 comprising processor circuitry 41, and a storage unit 42 storing instructions executable by said processor circuitry 41 whereby said server 3 is operative to send Constrained Application Protocol (CoAP) signalling to a network connected endpoint device 2 having a first address as its current address. The signalling comprises an Observe request for an information resource 34 of the device. The resource comprises the current address of the device stored therein. The server 3 is also operative to, in accordance with the sent signalling comprising the Observer request, receive CoAP signalling from the device 2, the signalling comprising information about the current address of the device stored in the resource 34.

Figure 4B:
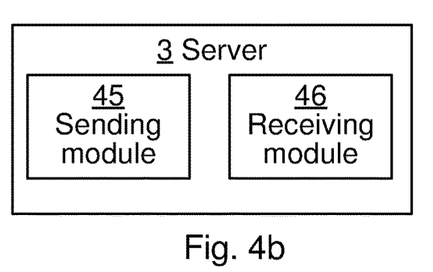
FIG. 4b is a schematic functional block diagram of an embodiment of a server in accordance with the present disclosure.

FIG. 4b is a schematic block diagram illustrating an embodiment of functional modules in the server 3, e.g. in the processor circuitry 41 of FIG. 4a. As previously mentioned, the processor circuitry 41 may run software 51 for enabling the server 3 to perform an embodiment of a method of the present disclosure, whereby functional modules may be formed for performing the different steps of the method. These modules are schematically illustrated as blocks within the server 3 in FIG. 4b. Thus, the server 3 comprises a sending module 45 for sending CoAP signalling to the network connected endpoint device 2 having a first address as its current address, the signalling comprising an Observe request for an information resource 34 of the device 2, said resource comprising the current address of the device stored therein. The server 3 also comprises a receiving module 46 for receiving CoAP signalling from the device 2, the signalling comprising information about the current address of the device 2 stored in the resource 34. Also, the sending module 45 may in some embodiments be configured for sending CoAP signalling to the device 2 comprising instructions to create the resource 34 in the device 2 configured for comprising the current address of the device.

Figure 5:
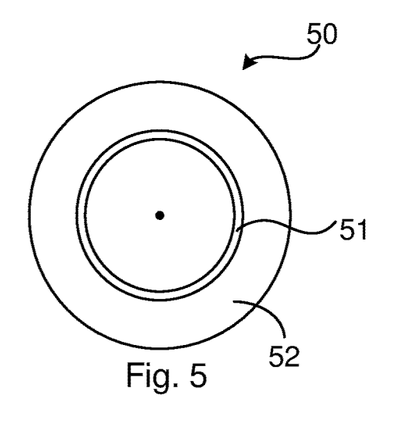
FIG. 5 is a schematic illustration of an embodiment of a computer program product in accordance with the present disclosure.

FIG. 5 illustrates a computer program product 50. The computer program product 50 comprises a computer readable medium 52 comprising a computer program 51 in the form of computer-executable components 51. The computer program/computer-executable components 51 may be configured to cause a device 2 or server 3, e.g. as discussed herein, to perform an embodiment of a method of the present disclosure. The computer program/computer-executable components may be run on the processor circuitry 31/41 of the device 2/server 3 for causing it to perform the method. The computer program product 50 may e.g. be comprised in a storage unit or memory 32/42 comprised in the device 2/server 3 and associated with the processor circuitry 31/41. Alternatively, the computer program product 50 may be, or be part of, a separate, e.g. mobile, storage means, such as a computer readable disc, e.g. CD or DVD or hard disc/drive, or a solid state storage medium, e.g. a RAM or Flash memory.

Figure 6A:
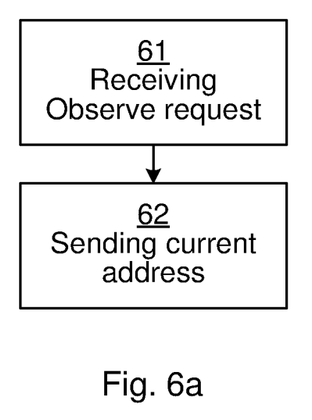
FIG. 6a is a schematic flow chart of an embodiment of a method performed in a device in accordance with the present disclosure.

FIG. 6a is a schematic flow chart of an embodiment of a method performed by the network connected endpoint device 2 in the communication network 1 and connected to the data network 5. The device 2 has a first address as its current address, i.e. some sort of location identifier indicating the current location of the device 2 in the communication network 1. The device 2 receives 61 CoAP signalling from a network server 3. The received signalling comprises an Observe request for an information resource 34 of the device, said resource being configured for comprising the current address (e.g. the first address, or a second address if the current address of the device has changed e.g. due to mobility) of the device stored therein. Then, in accordance with the received 61 Observe request, the device 2 sends 62 CoAP signalling to the server 3, the signalling comprising information about the current address of the device 2 stored in the resource 34.

Figure 6B:
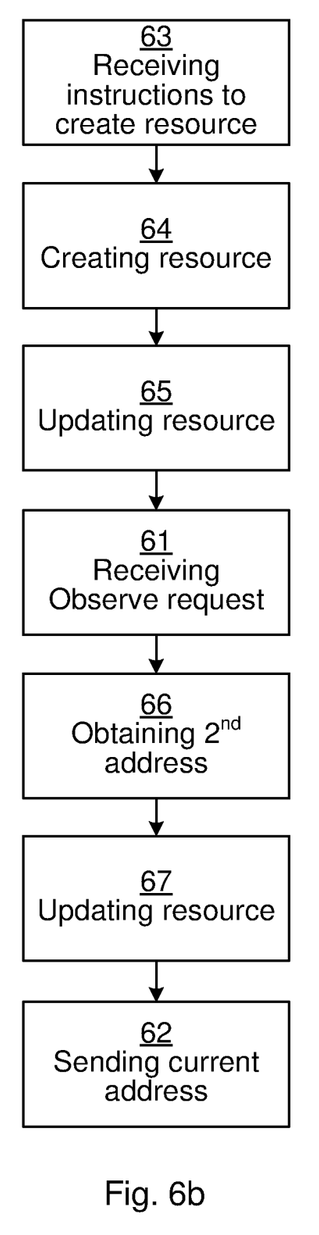
FIG. 6b is a schematic flow chart of another embodiment of a method performed in a device in accordance with the present disclosure.

FIG. 6b is a schematic flow chart of another embodiment of a method performed by the network connected endpoint device 2 in the communication network 1 and connected to the data network 5. The device 2 has a first address as its current address, i.e. some sort of location identifier indicating the current location of the device 2 in the communication network 1. Before the receiving 61 the Observe request as in the embodiment of FIG. 6a, the device 2 receives 63 CoAP signalling comprising instructions to create the resource 34 in the device 2, wherein the resource is configured for comprising the current address of the device. In accordance with the received 63 instructions, the device 2 creates 64 the resource 34. The empty, created 64, resource 34 is then updated 65 by the device 2, by storing the current address of the device 2 in said resource. The device 2 receives 61 the Observe request as discussed in relation to FIG. 6a, typically after the resource 34 has been created 64 but possibly before or during its creation. In the embodiment of FIG. 6b, the device 2 obtains 66 a second address, e.g. due to the device 2 moving within the communication network 1. Then, the device 2 updates 67 the resource 34 by removing the first address and instead storing the obtained 66 second address in the resource. The sending 62 of CoAP signalling to the server 3 performed after said update 67 with the second address will then comprise sending signalling comprising information about said second address as the current address of the device 2 stored in the resource 34.

In some embodiments of the present disclosure, the CoAP signalling comprising instructions to create the resource 34 is received 63 from the server 3. Alternatively, the CoAP signalling comprising instructions to create the resource 34 is received 63 from another network node, e.g. another (possibly previous) server or manager of the endpoint device 2. Alternatively, the resource 34 may be preconfigured, e.g. upon manufacturing of the device 2.

In some embodiments of the present disclosure, the obtaining 66 a second address is as part of mobility/nomadicity of the device 2, e.g. wherein the device changes from being attached to one part of the network to another part of the network or changes from one network interface to another. The mobility may e.g. comprise the device 2 registering with a new RD 4.

Figure 7A:
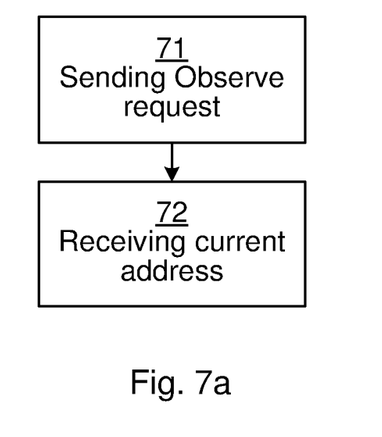
FIG. 7a is a schematic flow chart of an embodiment of a method performed in a server in accordance with the present disclosure.

FIG. 7a is a schematic flow chart of an embodiment of a method performed by the network server 3 in the data network 5 of the communication network 1. The server 3 sends 71 CoAP signalling to the network connected endpoint device 2, which device has a first address as its current address, the signalling comprising an Observe request for an information resource 34 of the device, said resource comprising the current address of the device stored therein. Then, in accordance with the sent 71 signalling comprising the Observe request, the server 3 receives 72 CoAP signalling from the device 2, the signalling comprising information about the current address of the device stored in the resource 34.

Figure 7B:
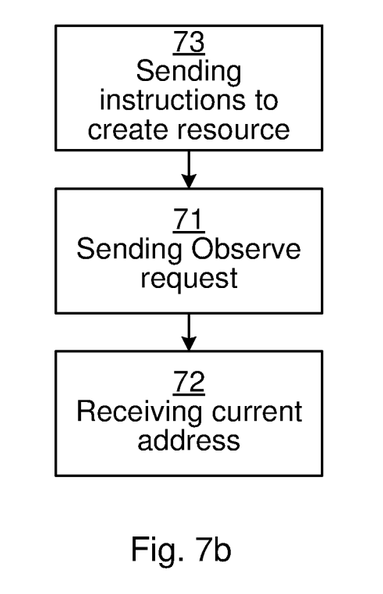
FIG. 7b is a schematic flow chart of another embodiment of a method performed in a server in accordance with the present disclosure.

FIG. 7b is a schematic flow chart of another embodiment of a method performed by the network server 3 in the data network 5 of the communication network 1. The steps of sending 71 CoAP signalling and receiving 72 CoAP signalling are as discussed above in relation to FIG. 7a. However, additionally, before the sending 71 of signalling comprising the Observe request, the server 3 sends 73 CoAP signalling to the device 2 comprising instructions to create the resource 34 in the device, the resource being configured for comprising the current address of the device.

In some embodiments of the present disclosure, regardless of whether a method is performed by the device 2 or the server 3, the current address of the device 2, and/or the address of the server 3, comprises an Internet Protocol (IP) address, a port, and/or a telephone number, or other network location identifier e.g. a Bloom filter, e.g. an IP address and a port. The port may be a transport layer port e.g. a UDP/TCP port number. Typically, CoAP is run on UDP.

In some embodiments of the present disclosure, regardless of whether a method is performed by the device 2 or the server 3, a Lightweight Machine-to-Machine (LWM2M) protocol is used for the signalling between the device 2 and the server 3. However, other protocols built on CoAP are also possible.

In some embodiments of the present disclosure, the device 2 is a radio device. The embodiments of the present disclosure may be especially suited for radio devices which may be more dependent on preserving energy. The radio device 2 may be any device or user equipment (UE), mobile or stationary, enabled to communicate over a radio cannel in a communications network, for instance but not limited to e.g. mobile phone, smart phone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC).

In some embodiments of the present disclosure, the device 2 is a constrained device, e.g. a Machine-to-Machine (M2M) device. Such a device may need to preserve memory and processing resources, making embodiments of the present disclosure suitable.

Example

Tables 1a and 1b (below) describe how the resource comprising the Object and sub-resources representing the current network address could, as an example, be represented using the standard object format of the Open Mobile Alliance (OMA) and the Internet Protocol Smart Objects (IPSO) Alliance. The resource is an LWM2M resource comprising an LWM2M Object: <Network Interface Object>.

TABLE 1a

| Object | Object ID | Object URN | Multiple Instances? |
|---|---|---|---|
| Network Interface | X | urn:oma:lwm2m:oma:X | Yes |

Object info: This object represents the existing network interface that the device is using for connectivity. In the present example, X is chosen to be 8, but any other Object ID (also included in the Object URN) is possible.

TABLE 1b

| Resource Name | Resource ID | Operations | Multiple Instances | Mandatory | Type | Range or Enumeration |
|---|---|---|---|---|---|---|
| Address | 0 | R | No | Yes | String | 1 |
| Port | 1 | R | No | Yes | Int | 1 |
| RD Address | 2 | R | No | Optional | Float | 1 |
| EP RD location | 3 | R | No | Optional | String | 1 |

Sub-resources info: Contains information taken from the existing state in the routing table in the device.

Description of the sub-resources:

Address—The address of the device, either IPv4 or IPv6.

Port—The port of the device. Default port is 5684.

RD Address—The address of the RD the device is registered to, either IPv4 or IPv6.

EP RD Location—The entry uri of the device in the rd (i.e. rd/I2bdu)

The information in Tables 1a and 1b may be sent by the device 2 in a notification to the server 3. Typically, MDs etc. have resources such as a sensor reading or the like, but in accordance with the present disclosure, a resource for the network interface, typically a network address of the device, is also used.

A JavaScript Object Notation (JSON) example of a notification sent from the device 2 to the server 3 is shown below in more detail.

The server 3 sends a GET Request to the Endpoint with the Observe option "ON".

Req: GET/8/1

The endpoint device 2 responds with the content of the Object in question. In this case it contains its IP address, port, address of the RD 4 and EP location in the RD (this location was previously sent from the RD when the endpoint device 2 registered), "n" is the name of the resource, that is the path of the resource relative to the request uniform resource identifier (URI). In this case the request is towards the actual instance of the Object (8/1) so the response contains the information of the resource ID of each resource (see Table 1b, above).

Res: 2.04 Content

```
{"e":[
{"n":"0", "sv":"2001:DB8::8329",
"n":"1", "v":"5684",
"n":"2", "sv":"2a00:1d50:2:101:7a31:c1ff:feca:8036",
"n":"3", "sv":"/rd/xb72h"}]
}
```

Below follow some other aspects of the present disclosure.

According to an aspect of the present disclosure, there is provided a device 2 configured for being a network connected endpoint device having a first address as its current address. The device comprises means (e.g. the processor circuitry 31 in cooperation with the communication interface 33, e.g. the receiving module 35) for receiving 61 Constrained Application Protocol (CoAP) signalling from a network server 3, the signalling comprising an Observe request for an information resource 34 of the device, said resource comprising the current address of the device stored therein. The device 2 also comprises means (e.g. the processor circuitry 31 in cooperation with the communication interface 33, e.g. the sending module 36) for, in accordance with the received 61 signalling comprising the Observe request, sending 62 CoAP signalling to the server 3, the signalling comprising information about the current address of the device 2 stored in the resource 34.

According to another aspect of the present disclosure, there is provided a server 3. The server comprises means (e.g. the processor circuitry 41 in cooperation with the communication interface 43, e.g. the sending module 45) for sending 71 CoAP signalling to a network connected endpoint device 2 having a first address as its current address, the signalling comprising an Observe request for an information resource 34 of the device, said resource comprising the current address of the device stored therein. The server 3 also comprises means (e.g. the processor circuitry 41 in cooperation with the communication interface 43, e.g. the receiving module 46) for, in accordance with the sent 71 signalling comprising the Observe request, receiving 72 CoAP signalling from the device 2, the signalling comprising information about the current address of the device stored in the resource 34.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method performed in a network connected endpoint device having a first Internet Protocol (IP) address as its current address, the method comprising:
   registering the endpoint device with a resource directory;
   in response to registering with the resource directory, receiving a location in the resource directory for the endpoint device;
   receiving Constrained Application Protocol (CoAP) signalling from a network server, in which the network server obtained access to the endpoint device by accessing the resource directory, the resource directory being separate from the network server, wherein the CoAP signalling comprising an Observe request for a resource of the endpoint device, said Observe request comprising an IP address of the network server;
   in accordance with the received CoAP signalling comprising the Observe request, sending CoAP signalling to the network server, the CoAP signalling to the network server comprising the current address of the endpoint device, an IP address of the resource directory, and the location in the resource directory;
   obtaining a second IP address for the endpoint device, due to a change in an IP address of the endpoint device;
   updating the resource by replacing the first IP address with the second IP address in the resource;
   re-registering the endpoint device with the second IP address for the location in the resource directory; and
   notifying the network server about the second IP address as the current address of the endpoint device.

2. The method of claim 1, further comprising:
   before the receiving of the CoAP signalling comprising the Observe request, receiving CoAP signalling comprising instructions to create the resource in the endpoint device;
   creating the resource in accordance with the received instructions; and
   updating the resource by storing the current address, the IP address of the resource directory, and the location in the resource directory in the resource.

3. The method of claim 2, wherein the CoAP signalling comprising instructions to create the resource is received from the network server.

4. The method of claim 1, wherein the obtaining the second IP address is due to mobility of the endpoint device.

5. A method performed in a network server, the method comprising:
   locating a network connected endpoint device via accessing a resource directory which stores registration information about the endpoint device, wherein the resource directory is separate from the network server;
   sending Constrained Application Protocol (CoAP) signalling to the endpoint device having a first Internet Protocol (IP) address as its current address, wherein the CoAP signalling comprising an Observe request for a resource of the endpoint device, said Observe request comprising an IP address of the network server;
   in accordance with sent signalling comprising the Observe request, receiving CoAP signalling from the endpoint device, the signalling from the endpoint device comprising the current address of the endpoint device, an IP address of the resource directory, and a location in the resource directory for the endpoint device; and
   in response to the endpoint device obtaining a second IP address due to a change in an IP address of the endpoint device, the endpoint device updating the resource by replacing the first IP address with the second IP address in the resource, and the endpoint device re-registering the second IP address in the resource directory, receiving a notification from the endpoint device that the second IP address is the current address of the endpoint device.

6. The method of claim 5, further comprising:
   before the sending of the CoAP signalling comprising the Observe request, sending CoAP signalling to the endpoint device comprising instructions to create the resource in the endpoint device configured for the current address of the endpoint device.

7. The method of claim 5, wherein a Lightweight Machine-to-Machine (LWM2M) protocol is used for the CoAP signalling between the endpoint device and the network server.

8. The method of claim 5, wherein the endpoint device is a radio device.

9. The method of claim 5, wherein the endpoint device is a constrained device.

10. A device configured for being a network connected endpoint device having a first Internet Protocol (IP) address as its current address, the device comprising:

processor circuitry; and
a storage unit storing instructions executable by said processor circuitry, wherein the instructions cause said device to perform operations to:
   register the device with a resource directory;
   in response to registering with the resource directory, receiving a location in the resource directory for the endpoint device;
   receive Constrained Application Protocol (CoAP) signalling from a network server, in which the network server obtained access to the device by accessing the resource directory, the resource directory being separate from the network server, wherein the CoAP signalling comprising an Observe request for a resource of the device, said Observe request comprising an IP address of the network server;
   in accordance with the received CoAP signalling comprising the Observe request, send CoAP signalling to the network server, the CoAP signalling to the network server comprising the current address of the device, an IP address of the resource directory, and the location in the resource directory;
   obtain a second IP address for the endpoint device, due to a change in an IP address of the endpoint device;
   update the resource by replacing the first IP address with the second IP address in the resource;
   re-register the endpoint device with the second IP address for the location in the resource directory; and
   notify the network server about the second IP address as the current address of the endpoint device.

11. A network server comprising:
processor circuitry; and
a storage unit storing instructions executable by said processor circuitry, wherein the instructions cause said network server to perform operations to:
   locate a network connected endpoint device via accessing a resource directory which stores registration information about the endpoint device, wherein the resource directory is separate from the network server;
   send Constrained Application Protocol (CoAP) signalling to the endpoint device having a first Internet Protocol (IP) address as its current address, wherein the CoAP signalling comprising an Observe request for a resource of the endpoint device, said Observe request comprising an IP address of the network server;
   in accordance with sent CoAP signalling comprising the Observer request, receive CoAP signalling from the endpoint device, the CoAP signalling from the endpoint device comprising the current address of the endpoint device, an IP address of the resource directory, and a location in the resource directory for the endpoint device; and
   in response to the endpoint device obtaining a second IP address due to a change in an IP address of the endpoint device, the endpoint device updating the resource by replacing the first IP address with the second IP address in the resource, and the endpoint device re-registering the second IP address in the resource directory, receive a notification from the endpoint device that the second IP address is the current address of the endpoint device.

12. A non-transitory computer readable storage medium having program code stored therein, which when executed on processor circuitry, cause a network connected endpoint device having a first Internet Protocol (IP) address as its current address to perform operations comprising:
   registering the endpoint device with a resource directory;
   in response to registering with the resource directory, receiving a location in the resource directory for the endpoint device;
   receiving Constrained Application Protocol (CoAP) signalling from a network server, in which the network server obtained access to the endpoint device by accessing the resource directory, the resource directory being separate from the network server, wherein the CoAP signalling comprising an Observe request for a resource of the endpoint device, said Observe request comprising an IP address of the network server;
   in accordance with the received CoAP signalling comprising the Observe request, sending CoAP signalling to the network server, the CoAP signalling to the network server comprising the current address of the endpoint device, an IP address of the resource directory, and the location in the resource directory;
   obtaining a second IP address for the endpoint device, due to a change in an IP address of the endpoint device;
   updating the resource by replacing the first IP address with the second IP address in the resource;
   re-registering the endpoint device with the second IP address for the location in the resource directory; and
   notifying the network server about the second IP address as the current address of the endpoint device.

13. A non-transitory computer readable storage medium having program code stored therein, which when executed on processor circuitry, cause a network server to perform operations comprising:
   locating a network connected endpoint device via accessing a resource directory which stores registration information about the endpoint device, wherein the resource directory is separate from the network server;
   sending Constrained Application Protocol (CoAP) signalling to the endpoint device having a first Internet Protocol (IP) address as its current address, wherein the CoAP signalling comprising an Observe request for a resource of the endpoint device, said Observe request comprising an IP address of the network server;
   in accordance with sent signalling comprising the Observe request, receiving CoAP signalling from the endpoint device, the signalling from the endpoint device comprising the current address of the endpoint device, an IP address of the resource directory, and a location in the resource directory for the endpoint device; and
   in response to the endpoint device obtaining a second IP address due to a change in an IP address of the endpoint device, the endpoint device updating the resource by replacing the first IP address with the second IP address in the resource, and the endpoint device re-registering the second IP address in the resource directory, receiving a notification from the endpoint device that the second IP address is the current address of the endpoint device.

14. The non-transitory computer readable storage medium of claim 12, wherein the program code further cause the endpoint device to perform operations comprising:
   before the receiving of the CoAP signalling comprising the Observe request, receiving CoAP signalling comprising instructions to create the resource in the endpoint device;
   creating the resource in accordance with the received instructions; and updating the resource by storing the current address, the IP address of the resource directory, and the location in the resource directory in the resource.

15. The non-transitory computer readable storage medium of claim 14, wherein the program code further cause the endpoint device to perform operations on the CoAP signalling received from the network server, in which the CoAP signalling comprising instructions to create the resource.

16. The non-transitory computer readable storage medium of claim 12, wherein the obtaining the second IP address is due to mobility of the endpoint device.

17. The non-transitory computer readable storage medium of claim 16, wherein the obtaining the second IP address is due to the endpoint device changing from being attached to one part of the network to another part of the network or changing from one network interface to another network interface.

18. The non-transitory computer readable storage medium of claim 13, wherein the program code further cause the network server to perform operations, comprising:
before the sending of the CoAP signalling comprising the Observe request, sending CoAP signalling to the endpoint device comprising instructions to create the resource in the endpoint device configured for comprising the current address of the endpoint device.

19. The method of claim 4, wherein the endpoint device changes from being attached to one part of the network to another part of the network or changes from one network interface to another network interface.

20. The method of claim 9, wherein the endpoint device is a Machine-to-Machine (M2M) device.

* * * * *